US009422892B2

(12) United States Patent
Pursifull

(10) Patent No.: US 9,422,892 B2
(45) Date of Patent: Aug. 23, 2016

(54) METHOD AND SYSTEM FOR GASEOUS AND LIQUID FUEL INJECTION

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 328 days.

(21) Appl. No.: 13/973,842

(22) Filed: Aug. 22, 2013

(65) Prior Publication Data

US 2015/0053180 A1 Feb. 26, 2015

(51) Int. Cl.

*F02M 21/00* (2006.01)
*F02D 41/00* (2006.01)
*F02M 21/02* (2006.01)
*F02D 19/02* (2006.01)
*F02D 41/30* (2006.01)
*F02M 31/18* (2006.01)

(52) U.S. Cl.

CPC ........ *F02M 21/0284* (2013.01); *F02D 19/024* (2013.01); *F02D 19/027* (2013.01); *F02D 41/003* (2013.01); *F02D 41/0025* (2013.01); *F02D 41/3094* (2013.01); *F02M 21/0212* (2013.01); *F02M 21/0245* (2013.01); *F02M 21/0275* (2013.01); *F02M 21/0287* (2013.01); *F02D 41/0027* (2013.01); *F02M 31/18* (2013.01); *Y02T 10/32* (2013.01)

(58) Field of Classification Search

CPC ............... Y02T 10/36; F02D 41/0025; F02D 41/0027; F02D 41/3094; F02D 19/0694; F02M 21/0287; F02M 43/00; F02M 31/18

USPC ........... 123/445, 27 GE, 299, 300, 304, 525, 123/526, 575–578; 701/102

See application file for complete search history.

(56) References Cited

U.S. PATENT DOCUMENTS 5,479,906 A 1/1996 Collie
5,711,282 A * 1/1998 Lang ..................... F02D 19/081 123/514
6,843,236 B1 1/2005 Shetley
7,478,628 B2 1/2009 Hines
7,980,230 B2 * 7/2011 Smart .................... F02M 31/10 123/514
2001/0003977 A1 6/2001 Hayashi et al.
2005/0011501 A1 * 1/2005 Shetley ............... F02D 19/0605 123/549
2006/0278195 A1 * 12/2006 Hotta ........................ C01B 3/22 123/274
2008/0053416 A1 * 3/2008 Hines .................... F02D 41/003 123/557
2011/0264355 A1 * 10/2011 Iwatani ................. F01N 13/009 701/103
2013/0333666 A1 * 12/2013 Ebner ................. F02D 19/0605 123/445
2014/0261327 A1 * 9/2014 Archer ............... F02M 21/0218 123/446

FOREIGN PATENT DOCUMENTS

JP H09268948 A 10/1997

OTHER PUBLICATIONS

Anonymous, "A Low Emission Engine Starting Strategy for Start/Stops," IPCOM No. 000240460, Published Jan. 30, 2015, 2 pages.

* cited by examiner

*Primary Examiner* — Mahmoud Gimie

(74) *Attorney, Agent, or Firm* — Julia Voutyras; Alleman Hall McCoy Russell & Tuttle LLP

(57) ABSTRACT

Methods and systems are provided for injecting liquid and gaseous fuel, such as propane, to an engine. In one example, under a first condition, liquid fuel from a bottom of a fuel tank is injected; under a second condition, liquid fuel from a the bottom of the fuel tank is vaporized and injected to the engine as vaporized liquid fuel; and under a third condition, gaseous fuel from a top of the fuel tank is injected to the engine.

20 Claims, 8 Drawing Sheets

ROM
CPU
RAM
KAM
I/O
PP
MAF
TP
MAP
ECT
PIP
SA
IGNITION SYSTEM

300

| Attribute | Gaseous Fuel Injection | Liquid Fuel Injection |
|---|---|---|
| Underhood liquid fuel goes above critical temperature/pressure when hot | + | - |
| Liquid injection requires return fuel system for fuel injector/fuel rail cooling | + | - |
| Gaseous injection limits power in naturally aspirated engines due to fuel displacing air | - | + |
| Liquid injection systems require fuel pumps at all temperatures | + | - |
| Gaseous injection systems do not require fuel pumps above moderately warm tank temperatures | + | - |
| LPG fuel pumps are durability challenged | + | - |
| Liquid injection provides charge cooling that is useful at high load operation | - | + |
| Liquid injection requires fuel tank cooling for hot environments | + | - |
| Gaseous injection requires fuel pumps below moderate temperatures | - | + |
| Gaseous injection requires coolant heating of the evaporator yielding marginal cold temperature operation | - | + |
| Liquid injection systems have a delayed engine cranking due to the need for recharging the liquid fuel rail | + | - |

FIG. 3

METHOD AND SYSTEM FOR GASEOUS AND LIQUID FUEL INJECTION

FIELD

The present application relates to injection of gaseous and liquid fuel, such as propane, to an internal combustion engine.

BACKGROUND AND SUMMARY

Fuel such as propane may be delivered to an engine in various phases (e.g., liquid and gaseous). In some examples, only liquid propane may be delivered to the engine; however, liquid propane injection may not be favorable under relatively hot conditions. In other examples, only gaseous propane may be delivered to the engine; however, gaseous propane injection may not be favorable under relatively cool conditions. In some examples, an engine system may include a multi-phase fuel system with separate tanks for liquid and gaseous fuel injection systems, which may be costly and require a large volume of space.

One approach to address the need for separate tanks in a multi-phase fuel system is described in U.S. Pat. No. 5,479,906. In this example, a multiple phase fuel supply system is described. Liquid fuel may be injected to the engine via a plurality of port injectors and gaseous fuel may be injected to the engine via a single port injector after passing through a pressure regulator. However, U.S. Pat. No. 5,479,906 does not describe injecting gaseous fuel directly from the fuel tank to the engine without first passing through a pressure regulator, which is commonly integrated with a vaporizer.

Thus, the inventor herein has devised an approach to at least partially address the issue described above. In one example, a method for operating an engine, comprising includes, under a first condition, injecting liquid fuel to the engine. The method further includes, under a second condition, injecting vaporized liquid fuel to the engine. The method further includes, under a third condition, injecting gaseous fuel to the engine. For example, the liquid fuel may be directed from a bottom of a fuel tank to the engine, the gaseous fuel may be directed from a top of the fuel tank to the engine, and the vaporized liquid fuel may be liquid fuel from the bottom of the fuel tank directed through a vaporizer to form gaseous fuel.

Thus, an engine system may include a multi-phase fuel system which includes a single fuel tank, for example. The fuel may be injected a single phase at a time or multiple phases of fuel may be used simultaneously depending on operating conditions. For example, liquid injection may be used to increase power. Vaporized liquid fuel injection may be used for increased fuel economy and/or during relatively hot ambient conditions. Gaseous fuel injection may be used during relatively hot ambient conditions and/or when a fuel rate is low. In this way, a multi-phase fuel system may be employed while reducing cost and meeting space constraints.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a table listing conditions for gaseous and liquid fuel injection.

DETAILED DESCRIPTION

Figure 1:
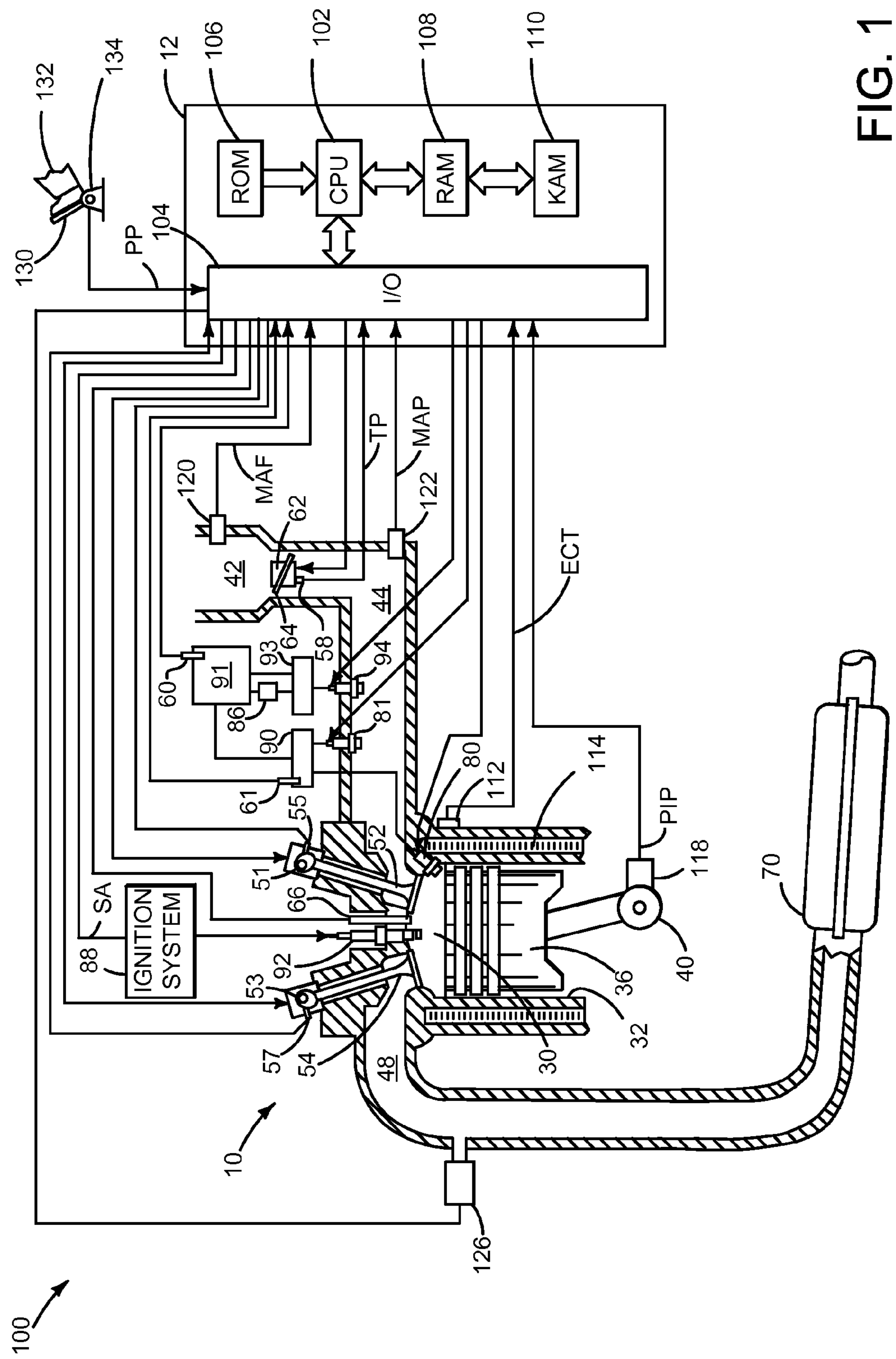
FIG. 1 shows a schematic diagram of an engine.
Figure 2:
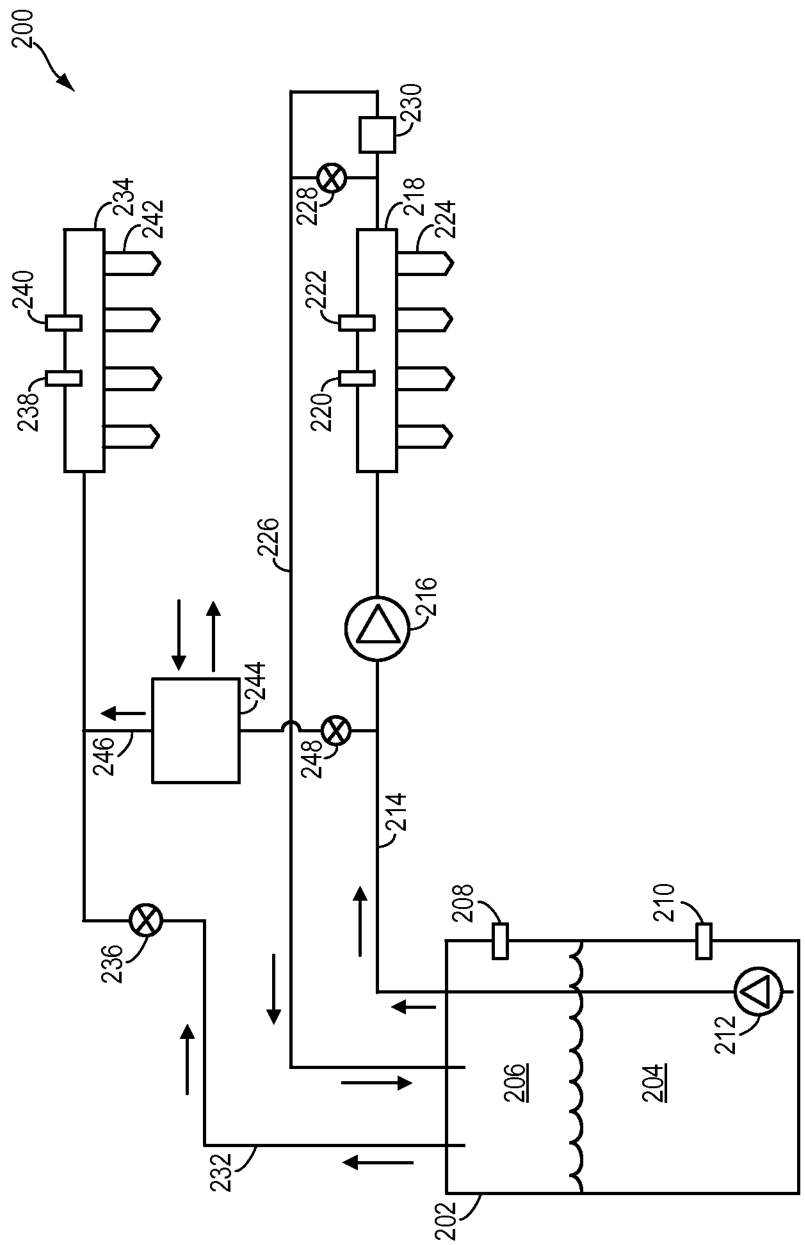
FIG. 2 shows a schematic diagram of a multi-phase fuel system.

The following description relates to systems and methods for an engine system which includes a multi-phase fuel system, such as the engine system shown in FIG. 1 and the multi-phase fuel system shown in FIG. 2. Whether or not gaseous or liquid fuel injection is favorable may depend on various conditions, as shown in the table of FIG. 3. Further, each of the conditions may be a fuel handling consideration, a fuel economy consideration, a fuel tank handling consideration, or a combustion consideration, as described with reference to flow charts shown FIGS. 4-7. Based on the operating conditions, liquid fuel may be injected to the engine via port injectors or direct injectors, or gaseous fuel (from the top of the fuel tank or vaporized fuel from a bottom of the fuel tank) may be injected to the engine via port injectors. Under some conditions, as described with reference to FIG. 8, liquid and gaseous fuel injection may be used simultaneously.

Referring to FIG. 1, an internal combustion engine 10 comprising a plurality of cylinders, one cylinder of which is shown in FIG. 1, is controlled by an electronic engine controller 12. The engine 10 includes a combustion chamber (i.e., cylinder) 30 and cylinder walls 32 with a piston 36 positioned therein and connected to a crankshaft 40. The combustion chamber 30 is shown communicating with an intake manifold 44 and an exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of the intake cam 51 may be determined by an intake cam sensor 55. The position of the exhaust cam 53 may be determined by an exhaust cam sensor 57.

A direct liquid fuel injector 66 is shown positioned to inject liquid fuel directly into the cylinder 30, which is known to those skilled in the art as direct injection. Alternatively, liquid fuel may be injected to an intake port, which is known to those skilled in the art as port injection. The direct liquid fuel injector 66 delivers liquid fuel in proportion to a pulse width from controller 12. Liquid fuel is delivered to the direct liquid fuel injector 66 by a fuel system (shown in FIG. 2) including a fuel tank, fuel pump, and fuel rail.

A port liquid fuel injector 81 is shown positioned to inject liquid fuel from a fuel tank 91 into the intake manifold 44. For reference, a direct liquid fuel injector 80 is shown positioned to inject liquid fuel directly into the cylinder 30. In some examples, the port liquid fuel injector 81 may be positioned in an intake port (which may be integrated into the cylinder head or the intake manifold). In other examples, the liquid fuel injector 81 may inject liquid fuel into a central area of the intake manifold. Both the port liquid fuel injector 81 and the direct liquid fuel injector 80 may provide liquid fuel to the engine 10. However, liquid fuel may be supplied solely via port liquid fuel injector 81 without direct liquid fuel injector 80 in other examples. Additionally, liquid fuel may be supplied solely via direct liquid fuel injector 80 without port liquid fuel injector 81 in still other examples. The port liquid fuel injector 81 and direct liquid fuel injector 80 receive liquid fuel via a fuel rail 90 and the fuel tank 91.

Further, a port gaseous fuel injector 94 is shown positioned to inject gaseous fuel from the fuel tank 91 into the intake manifold 44. In some examples, the port gaseous fuel injector 94 may be positioned in an intake port of a cylinder head. In other examples, the gaseous fuel injector 94 may inject gaseous fuel into a central area of the intake manifold. The gaseous fuel injector 94 may provide gaseous fuel to engine 10. The port gaseous fuel injector 94 receive gaseous fuel via a fuel rail 93 and the fuel tank 91. A pressure regulator 86, or vaporizer, controls pressure that is delivered to the fuel rail 93 by the fuel tank 91, and may form vaporized liquid fuel when liquid fuel from a bottom of the fuel tank 91 is directed to the fuel rail 93. Herein, pressure of gas in the fuel tank 91 is sensed via a pressure sensor 60; however, in some embodiments, pressure of gas in the fuel tank 91 may be inferred via a high pressure line pressure. The pressure in the fuel rail 90 is sensed via pressure sensor 61.

The intake manifold 44 is shown communicating with an optional electronic throttle 62 that adjusts a position of a throttle plate 64 to control air flow from an air intake 42 to the intake manifold 44. The electronic throttle 62 is shown positioned in between the intake manifold 44 and the air intake 42.

A distributorless ignition system 88 provides an ignition spark to the combustion chamber 30 via spark plug 92 in response to the controller 12. A universal Exhaust Gas Oxygen (UEGO) sensor 126 is shown coupled to the exhaust manifold 48 upstream of a catalytic converter 70. Alternatively, a two-state exhaust gas oxygen sensor may be substituted for the UEGO sensor 126.

The converter 70 can include multiple catalyst bricks, in one example. In another example, multiple emission control devices, each with multiple bricks, can be used. The converter 70 can be a three-way type catalyst in one example.

The controller 12 is shown in FIG. 1 as a conventional microcomputer including: a microprocessor unit 102, input/output ports 104, read-only memory 106, random access memory 108, keep alive memory 110, and a conventional data bus. The controller 12 is shown receiving various signals from sensors coupled to the engine 10, in addition to those previously discussed, including: engine coolant temperature (ECT) from a temperature sensor 112 coupled to a cooling sleeve 114; a position sensor 134 coupled to an accelerator pedal 130 for sensing force applied by a foot 132; a measurement of engine manifold pressure (MAP) from a pressure sensor 122 coupled to the intake manifold 44; an engine position sensor from a Hall effect sensor 118 sensing a crankshaft 40 position; a measurement of air mass entering the engine from a sensor 120; and a measurement of throttle position from a sensor 58. Barometric pressure may also be sensed (sensor not shown) for processing by the controller 12. In a preferred aspect of the present description, an engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. Generally, during the intake stroke the exhaust valve 54 closes and the intake valve 52 opens. Air is introduced into the combustion chamber 30 via the intake manifold 44, and the piston 36 moves to the bottom of the cylinder so as to increase the volume within the combustion chamber 30. The position at which the piston 36 is near the bottom of the cylinder and at the end of its stroke (e.g. when combustion chamber 30 is at its largest volume) is typically referred to by those of skill in the art as bottom dead center (BDC). During the compression stroke, the intake valve 52 and the exhaust valve 54 are closed. The piston 36 moves toward the cylinder head so as to compress the air within the combustion chamber 30. The point at which the piston 36 is at the end of its stroke and closest to the cylinder head (e.g., when the combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as a spark plug 92, resulting in combustion. During the expansion stroke, the expanding gases push the piston 36 back to BDC. The crankshaft 40 converts piston movement into a rotational torque of the rotary shaft. Finally, during the exhaust stroke, the exhaust valve 54 opens to release the combusted air-fuel mixture to the exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIGS. 1 and 2 show schematic depictions of the engine system 100 and a multi-phase fuel system 200, respectively. As described above, engine system 100 includes a controller 12 and a multi-phase fuel system. During high load conditions direct injection of liquid fuel provides multiple advantages. For example, introducing liquid fuels with direct injection and high heat of vaporization at high load provides charge cooling for increased air charge, dilution for combustion temperature control, and knock resistance. On the other hand, port injection may provide advantages during low load conditions. For example, introducing high volatility fuels by intake injection at low load may provide enhanced startability, particulate emission reduction, and less unvaporized fuel. In addition, gaseous fuel may reduce pumping losses by displacing air. Therefore, by utilizing either direct or port injection of liquid fuel or port injection of gaseous fuel over various areas of the speed-load map, the benefits provided by both fuel phases may be substantially maximized.

The multi-phase fuel system 200 may include one or more fuel tanks. In the example depicted in FIG. 2, the fuel system includes a fuel tank 202 configured to hold fuel, such as gasoline, diesel, propane, liquefied natural gas (LNG), compressed natural gas (CNG), ethanol, etc. In some embodiments, the fuel tank 202 may hold a plurality of fuels or fuel blends (e.g., ethanol fuel blends). In the example shown in FIG. 2, the fuel tank 202 holds liquid fuel at a bottom portion 204 of the tank, while the top portion 206 may hold a gaseous form of the same fuel. Further, at least one pressure sensor 208 and one temperature sensor 210 may be disposed within the fuel tank 202 to measure fuel tank pressure and temperature, respectively, and to output pressure and temperature data to the control system.

A fuel pump 212 disposed in the fuel tank 202 pumps the fuel out of the fuel tank via a liquid fuel line 214. In some examples, such as the example shown in FIG. 2, the fuel may pass though a boost pump 216 before it is directed to a liquid fuel rail 218. Temperature and pressure of the fuel in the liquid fuel rail 218 are monitored by a temperature sensor 220 and a pressure sensor 222 disposed within the fuel rail and configured to output temperature and pressure data, respectively, to the control system. In some examples, the fuel tank temperature may be inferred from fuel tank pressure if the fuel type is known. The liquid fuel is delivered to a set of liquid fuel injectors 224, which inject fuel to the engine (such as engine 10 described above with reference to FIG. 1). The liquid fuel injectors 224 may be a set of port liquid fuel injectors or may be a set of direct liquid fuel injectors, as described above.

The fuel system 200 further includes a return fuel line 226 which carries fuel from the liquid fuel rail 218 back to the fuel tank 202. Returning fuel to the fuel tank from the liquid fuel rail 218 may provide liquid fuel injector and/or liquid fuel rail cooling, for example. As depicted, the return fuel line 226 includes a return valve 228 and a regulator 230 to regulate the flow of fuel back to the fuel tank 202.

The fuel system 200 further includes a second fuel line 232 which directs gaseous fuel from the top 206 of the fuel tank 202 to a gaseous fuel rail 234 via a valve 236. Temperature and pressure of the fuel in the gaseous fuel rail 234 are monitored by a temperature sensor 240 and a pressure sensor 238 disposed within the fuel rail and configured to output temperature and pressure data, respectively, to the control system. The gaseous fuel is delivered to a set of gaseous fuel injectors 242, which inject gaseous fuel to the engine (such as engine 10 described above with reference to FIG. 1). As described above, the gaseous fuel injectors may be port fuel injectors.

Further, liquid fuel may be directed from the bottom 204 of the fuel tank 202 to a vaporizer 244, or pressure regulator, via a valve 248. The vaporizer may exchange heat with coolant circulating through the engine system, for example, such that the liquid fuel is warmed and vaporized for form vaporized liquid fuel that is delivered to the engine in gaseous form.

Thus, the multi-phase fuel system 200 may deliver liquid, gaseous, or vaporized liquid fuel to the engine. As will be described in greater detail below, the type (e.g., phase) of fuel delivered to the engine may depend on various system operating conditions.

FIG. 3 shows a table listing various conditions for gaseous and liquid fuel injection in an engine system with a multi-phase fuel system, such as the multi-phase fuel system 200 described above. The various conditions may include fuel handing, fuel economy, fuel tank handling, and combustion considerations, which are further described with reference to flow charts shown in FIGS. 4-7, respectively. Responsive to the various conditions, liquid fuel, vaporized liquid fuel, or gaseous fuel injection to the engine may be favorable. For example, under a first condition, liquid fuel from a bottom of the fuel tank may be injected to the engine; under a second condition, vaporized liquid fuel may be injected to the engine, where the vaporized liquid fuel is liquid fuel from the bottom of the fuel tank directed though a vaporizer to form gaseous fuel; and under a third condition, gaseous fuel from a top of the fuel tank may be injected to the engine. The first condition may include receiving a request for increased fuel economy, receiving an indication of a high ambient temperature, and/or receiving an indication of a coolant temperature greater than a threshold coolant temperature. The second condition may include receiving a request for increased fuel economy, receiving an indication of a high ambient temperature, and/or receiving an indication of a coolant temperature greater than a threshold coolant temperature. The third condition may include receiving an indication of a high ambient temperature, receiving an indication of a low fuel rate, and/or receiving an indication of a fuel tank temperature greater than a threshold tank temperature. Further, under some conditions, as described below with reference to FIG. 8, a combination of different types of fuel injection may be used simultaneously.

Continuing to FIG. 3, a table 300 shows various attributes under which gaseous or liquid fuel injection are favorable in an engine system with a multi-phase fuel system, such as the multi-phase fuel system 200 described above.

Underhood liquid fuel (e.g., propane) goes above a critical pressure/temperature when hot (so hot that it cannot exist as a liquid). Under such a condition, gaseous fuel injection is favorable. Liquid injection requires a return fuel system for fuel injector/fuel rail cooling. Under such a condition, gaseous fuel injection is favorable. Gaseous fuel injection limits power in naturally aspirated engines due to fuel displacing air; thus, liquid fuel injection is favorable under conditions in which greater power is desired. Liquid injection systems require fuel pumps at all temperatures. As such, gaseous fuel injection is favorable if fuel pumping is not required. Gaseous injection systems do not require fuel pumps above moderately warm fuel tank temperature. As such, gaseous fuel injection is favorable. LPG fuel pumps are durability challenged (e.g., black death), thus, gaseous fuel injection is favorable. Liquid injection provides charge cooling that is useful at high load operation. Under such conditions, liquid fuel injection is favorable. Liquid fuel injection requires fuel tank cooling for hot environments, thus, gaseous fuel injection is favorable. Gaseous injection requires fuel pumps and evaporators below moderate temperature, thus, liquid fuel injection is favorable. Gaseous fuel injection requires coolant heating of the evaporator yielding marginal cold temperature operation. As such, liquid fuel injection is favorable. Finally, liquid fuel injection systems have delayed engine cranking due to the need for recharging the fuel rail. Under such conditions, gaseous fuel injection is favorable.

Figure 4:
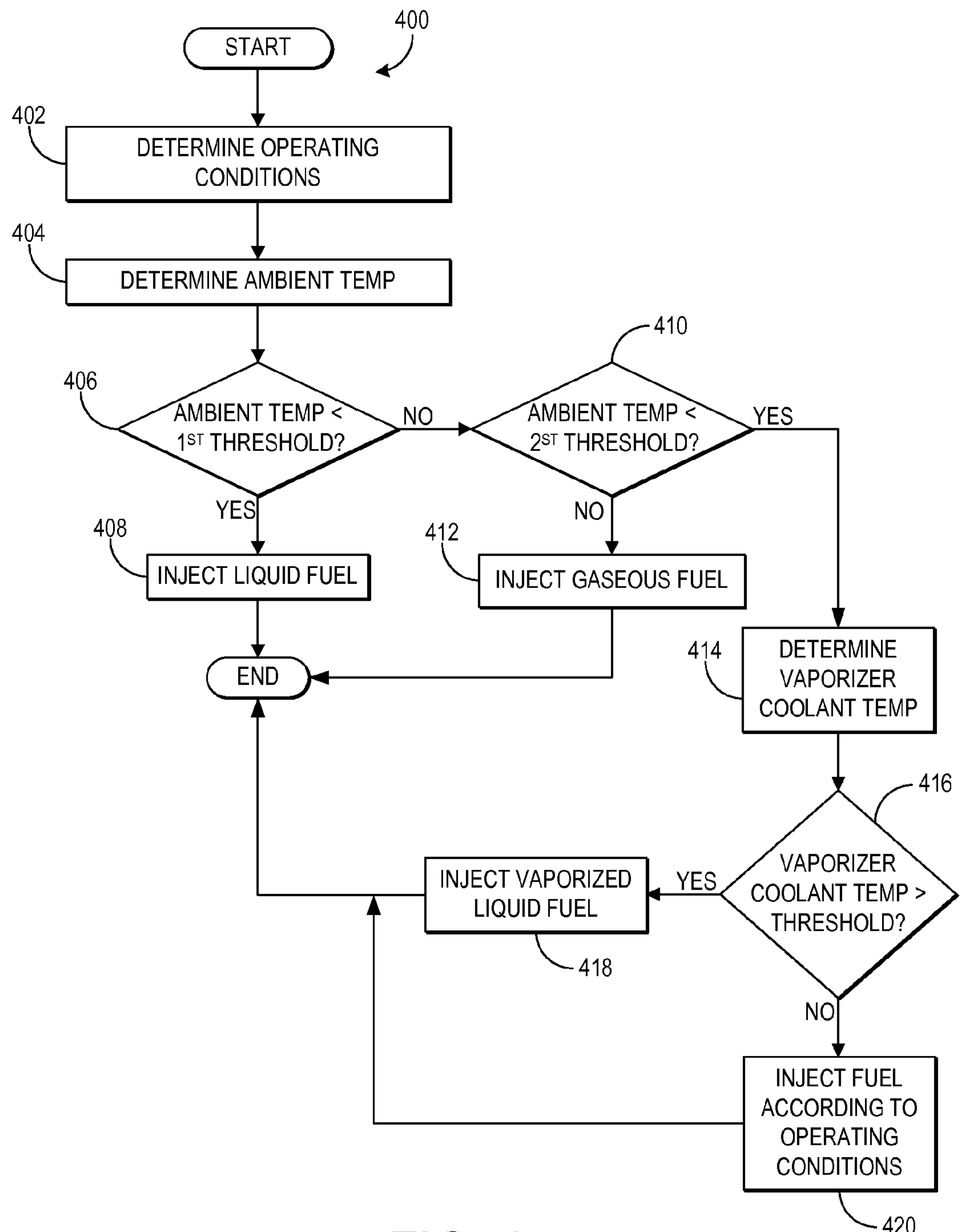
FIG. 4 shows a flow chart illustrating a routine for determining fuel injection type based on fuel handling considerations.

Continuing to FIG. 4, a flow chart illustrating a routine 400 for determining fuel injection type based on fuel handling considerations is shown. Specifically, the routine 400 determines ambient temperature and vaporizer coolant temperature. Type of fuel injection is then determined based on the ambient temperature and the vaporizer coolant temperature.

At 402, system operating conditions are determined. As non-limiting examples, the operating conditions may include ambient temperature, engine speed, engine load, manifold air pressure, charge temperature, etc.

Once the operating conditions are determined, the routine proceeds to 404 where the ambient temperature is determined. The ambient temperature is a temperature of the of the air surrounding a vehicle in which the engine system is positioned. As an example, the ambient temperature may be determined based on output from a temperature sensor.

Once the ambient temperature is determined, it is determined if the ambient temperature is less than a first threshold temperature at 406. If it is determined that the ambient temperature is less than the first threshold temperature, liquid fuel is injected to the engine at 408. At cold temperatures, the vapor pressure of propane is too low to support gaseous injection, for example; as such, liquid fuel injection is favorable under such conditions.

On the other hand, if it is determined that the ambient temperature is greater than the first temperature, the routine moves to 410 where it is determined if the ambient temperature is less than a second threshold temperature. If it is determined that the ambient temperature is greater than the second threshold temperature, the routine continues to 412 where gaseous fuel from the top of the fuel tank is injected to the engine. For example, at hot temperatures, the vapor pressure of propane may be too high to keep it as a liquid for liquid injection, thus making gaseous injection favorable.

If, instead, it is determined that the ambient temperature is less than the second threshold temperature, the routine moves to 414 where the vaporizer coolant (or heatant) temperature is determined. The vaporizer coolant temperature may be a temperature of the coolant after it has passed through the vaporizer. As such, at 416, if it is determined that the vaporizer coolant temperature is too high (e.g., greater than a threshold temperature), the routine proceeds to 418 where vaporized liquid fuel is injected to the engine. For example, liquid fuel is pumped from the bottom of the fuel tank and directed through a vaporizer, or pressure regulator to form vaporized liquid fuel before it reaches the gaseous fuel injectors. In this manner, the liquid fuel may be vaporized while providing cooling to the coolant.

On the other hand, if it is determined that the vaporizer coolant temperature is less than the threshold temperature, the routine moves to 420 where fuel is injected according to operating conditions. For example, liquid and/or gaseous fuel may be injected depending on other conditions, such as those described below with reference to FIGS. 5-7.

Thus, liquid, gaseous, or vaporized liquid fuel may be injected to the engine depending on various combustion conditions. For example, liquid fuel injection is favorable at low ambient temperature, gaseous fuel injection is favorable at high ambient temperature, and vaporized liquid fuel injection is favorable when the ambient temperature is very high and for vaporizer coolant cooling.

Figure 5:
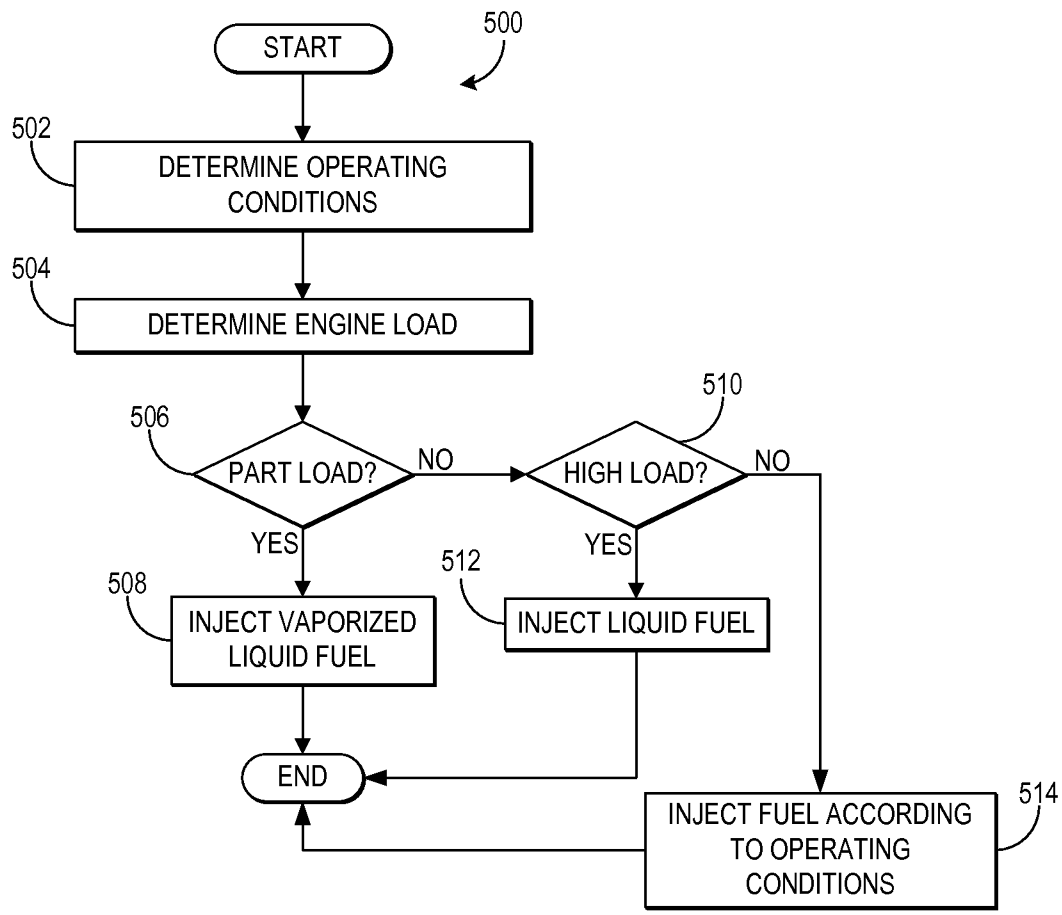
FIG. 5 shows a flow chart illustrating a routine for determining fuel injection type based on fuel economy considerations.

Continuing to FIG. 5, a flow chart illustrating a routine 500 for determining fuel injection type based on fuel economy considerations is shown. Specifically, the routine 500 determines engine load and selects the type of fuel injection based on whether the engine is operating at part load.

At 502, system operating conditions are determined. As non-limiting examples, the operating conditions may include ambient temperature, engine speed, engine load, manifold air pressure, charge temperature, etc.

Once the operating conditions are determined, the routine proceeds to 504 where the engine load is determined. For example, it may be determined that the engine is operating at part load, or low or high load. In some examples, the engine load may be determined, at least in part, based on the intake manifold air flow (e.g., MAF sensor).

At 506, it is determined if the engine is operating at part load. If it is determined that the engine is operating at part load, the routine continues to 508 where vaporized liquid fuel is injected to the engine. For example, at part load, port injection of vaporized liquid fuel displaces more air, thereby increasing manifold air pressure (MAP), and thus reducing pumping losses. In this way, fuel economy may be increased. Further, in another example, gaseous fuel (or vapor) right off the fuel tank top may be used first in an effort to save the cost of running the in-tank lift pump. As soon as the fuel injection pressure drops below 2.5 bar, however, either use of tank vapor needs to be stopped or a larger portion of a different fuel source may be used. Second, the fuel tank's t lift pump may be turned on in order to pump liquid fuel to the vaporizer/regulator. This will provide vaporized liquid fuel under a wide range of conditions, except for at cold ambient and when engine coolant is cold. Third, liquid fuel injection may be used.

On the other hand, if it is determined that the engine is not operating at part load, the routine moves to 510 it is determined if the engine is operating under a high load. If it is determined that the engine is operating at high load, the routine proceeds to 512 where liquid fuel is injected to the engine. For example, by injecting liquid fuel to the engine at high load, maximum power may be output by the engine. In some examples, however, if the fuel rail temperature is near or above a critical temperature of 96° C., gaseous fuel injection may be used because the fuel density in the fuel rail becomes unknown (since it is or may have gone super critical). Because liquid fuel injection may become a potentially rare event, liquid injection may need commanding for special purposes such as injector durability, assisted direct start (e.g., start/stop), knock prevention, and diagnostics, for example.

If, instead it is determined that the engine is not operating at high load, the routine moves to 514 where fuel is injected according to operating conditions of the engine system. For example, liquid and/or gaseous fuel may be injected depending on other conditions, such as those described herein with reference to FIGS. 4, 6, and 7.

Thus, when the engine is operating at part load, vaporized liquid fuel injection may be employed such that fuel economy may be increased.

Figure 6:
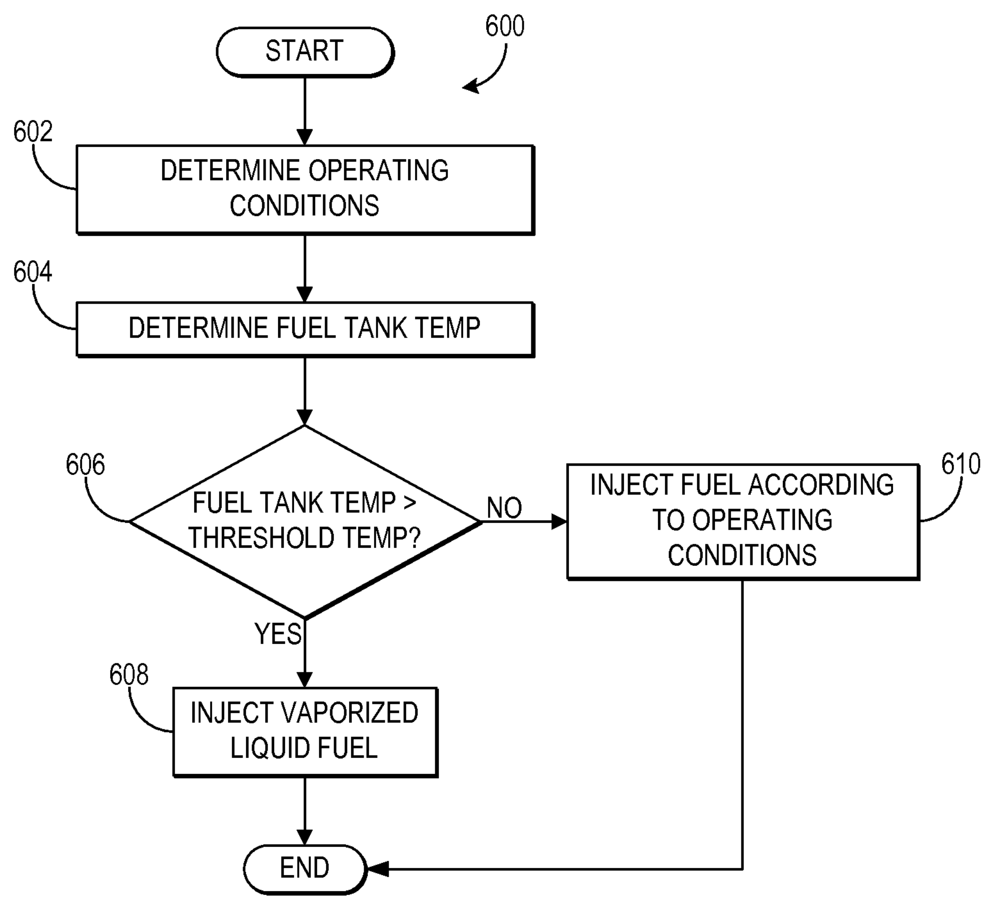
FIG. 6 shows a flow chart illustrating a routine determining fuel injecting type based on fuel tank handling considerations.

Continuing to FIG. 6, a flow chart illustrating a routine 600 for determining fuel injecting type based on fuel tank handling considerations is shown. Specifically, the routine 600 determines a temperature of the fuel tank and selects the type of fuel injection based on whether the fuel tank temperature is less than or greater than a threshold temperature.

At 602, system operating conditions are determined. As non-limiting examples, the operating conditions may include ambient temperature, engine speed, engine load, manifold air pressure, charge temperature, etc.

Once the operating conditions are determined, the routine proceeds to 604 where a fuel tank temperature is determined. The fuel tank temperature may be based on output from a temperature sensor disposed in the fuel tank, for example.

At 606, it is determined if the fuel tank temperature is less than a threshold temperature. As an example, the threshold temperature may be a temperature gaseous fuel injection is not possible. For example, taking fuel off the top of the fuel tank as vapor for gaseous fuel injection cools the fuel tank to the point where the fuel temperature and vapor pressure drop to the point where the pressure is too low for gaseous fuel injection. Thus, if it is determined that the fuel tank temperature is less than the threshold temperature, the routine moves to 608 where vaporized liquid fuel is injected to the engine. For example, liquid fuel is directed from the fuel tank to the vaporizer to form vaporized liquid fuel before it is injected to the engine.

On the other hand, if it is determined that the fuel tank temperature is greater than the threshold temperature, the routine moves to 610 where fuel is injected according to operating conditions of the engine system. For example, liquid and/or gaseous fuel may be injected depending on other conditions, such as those described herein with reference to FIGS. 4, 5, and 7.

Thus, in terms of fuel tank handling considerations, when the fuel tank temperature is less than a threshold temperature, vaporized liquid fuel is injected to the engine such that further fuel tank cooling does not occur and gaseous fuel injection may still be carried out.

Figure 7:
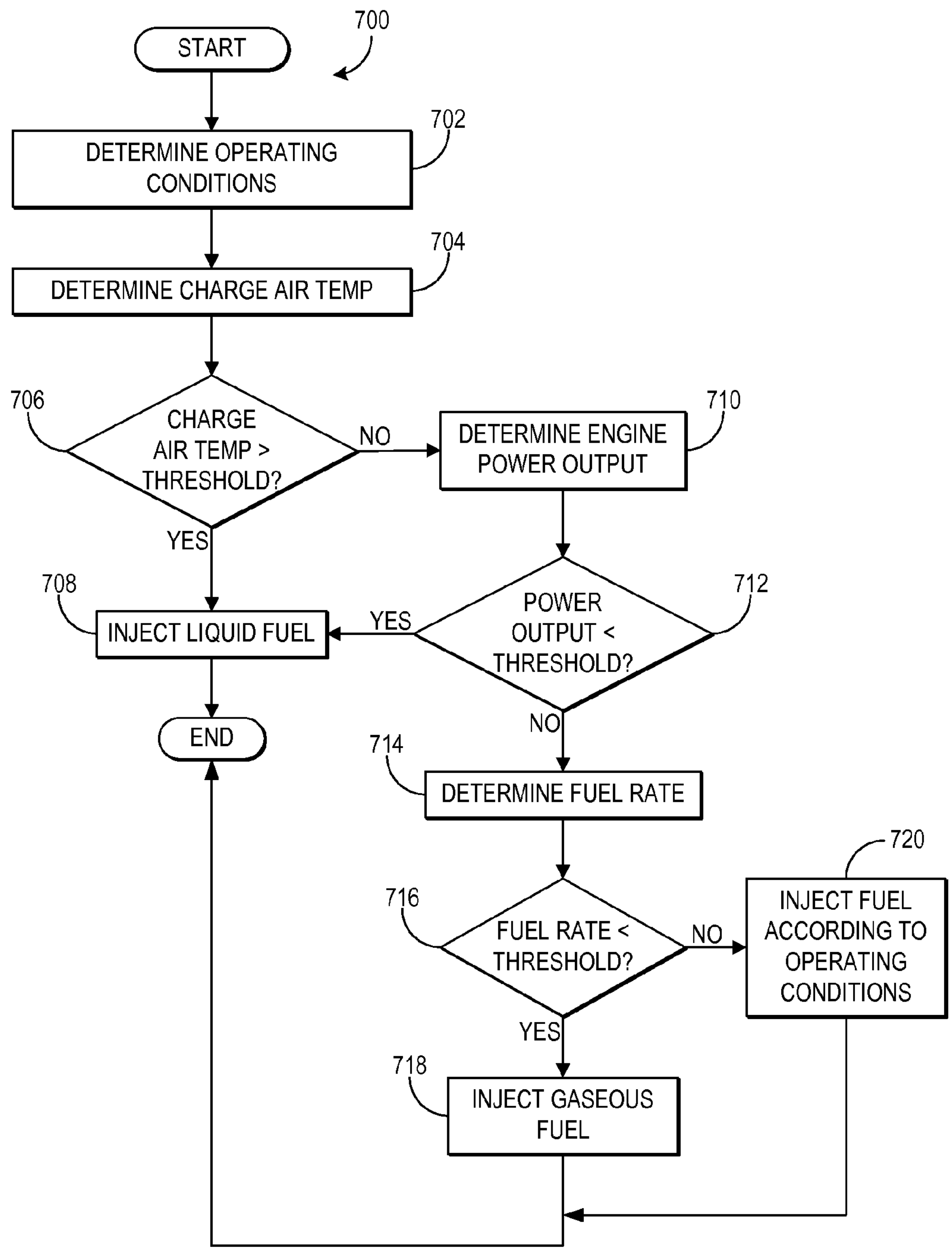
FIG. 7 shows a flow chart illustrating a routine determining fuel injection type based on combustion considerations.

Continuing to FIG. 7, a flow chart illustrating a routine 700 for determining fuel injection type based on combustion considerations is shown. Specifically, the routine 700 determines operating conditions such as charge air temperature, engine power output, and fuel rate. Based on the operating conditions, the most favorable type of fuel injection is selected for each condition (e.g., liquid or gaseous).

At 702, system operating conditions are determined. As non-limiting examples, the operating conditions may include ambient temperature, engine speed, engine load, manifold air pressure, charge temperature, etc.

Once the operating conditions are determined, the routine proceeds to 704 where a temperature of the charge air is determined. The temperature of the charge air may be determined based on output from a temperature sensor disposed in the intake manifold, for example.

At 706, it is determined if the charge air temperature is greater than a threshold charge air temperature. The threshold charge air temperature may be a variable temperature that is based on desired operating condition, for example. If it is determined that the charge air temperature is greater than the threshold temperature, the routine continues to 708 where liquid fuel is injected to the engine. For example, injecting the fuel in the form of liquid allows the fuel to flash to vapor in the intake port or in the cylinder such that charge cooling occurs. In this way, the temperature of the charge air may be reduced to a desired temperature.

On the other hand, if it is determined that the charge air temperature is less than the threshold temperature, the routine moves to 710 where the engine power output is determined. At 712 it is determined if the engine power is less than a threshold power. For example, the threshold power may be variable and may be a desired power, such as maximum power. If it is determined that the engine power is less than the threshold power, the routine moves to 708 where liquid fuel is injected to the engine. For example, liquid fuel injection displaces less air than gaseous fuel injection, thereby increasing air charge, and thus power. Further direct injection of liquid fuel is preferred over port injection, as direct injection displaces less air, thereby increasing air charge, and thus power.

On the other hand, if it is determined that engine power output is greater than the threshold power, the routine continues to 714 where the fuel rate is determined. As an example, the fuel rate may be a rate of consumption of fuel by the engine. As such, the fuel rate may be a number gallons consumed per minute or per mile, for example. At 716, it is determined if the fuel rate is less than a threshold fuel rate. If it is determined that the fuel rate is less than the threshold fuel rate, the routine proceeds to 718 where gaseous fuel is injected to the engine. For example, the gaseous fuel is taken from the top of the fuel tank. Because the fuel rate is low, gaseous fuel may be taken from the top of the fuel tank without cooling down the fuel tank too much, for example.

If, instead, it is determined that the engine power output is greater than the threshold power, the routine moves to 720 where fuel is injected according to operating conditions of the engine system. For example, liquid and/or gaseous fuel may be injected depending on other conditions, such as those described above with reference to FIGS. 4-6.

Thus, liquid or gaseous fuel may be injected to the engine depending on various combustion conditions. For example, liquid fuel injection is favorable in order to cool charge air and increase engine power output. Gaseous fuel injection is favorable when the fuel rate is low.

Figure 8:
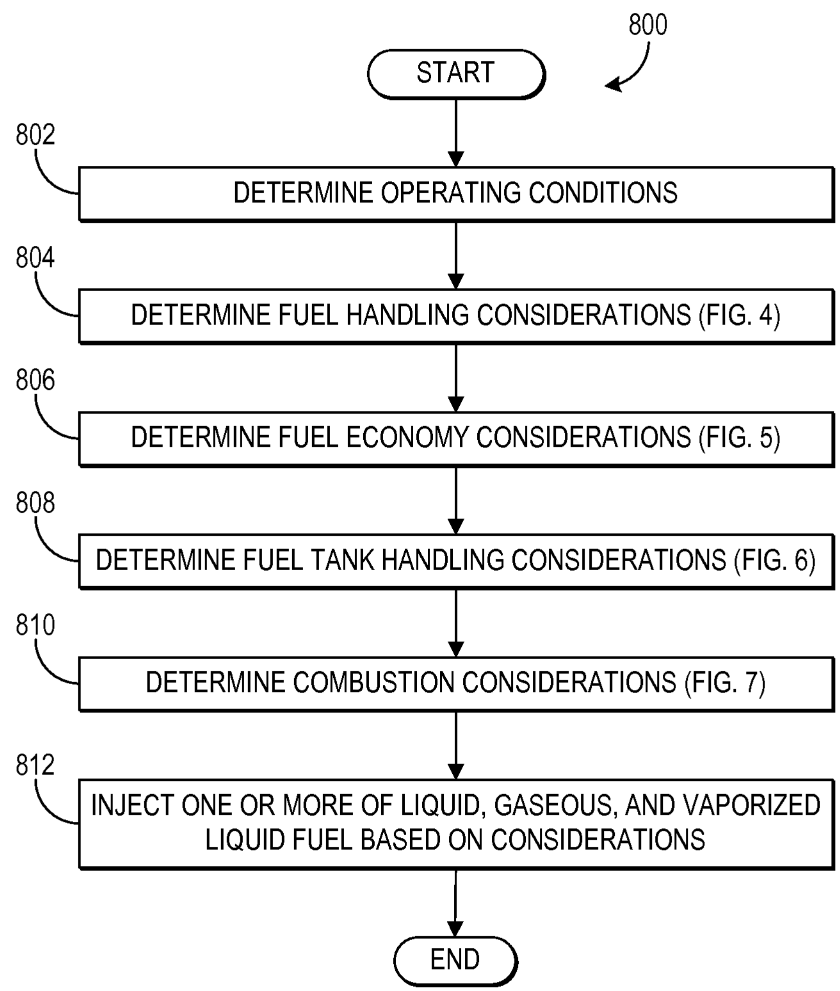
FIG. 8 shows a flow chart illustrating a routine for determining fuel injection type(s) based on operating conditions.

Continuing to FIG. 8, a flow chart illustrating a routine 800 for determining fuel injection type(s) based on operating conditions is shown. Specifically, the routine 800 determines the various fuel injection considerations described above with reference to the flow charts shown in FIGS. 4-7. Based on the various fuel injection considerations, a favorable type or types of fuel injection are selected.

At 802, system operating conditions are determined. As non-limiting examples, the operating conditions may include ambient temperature, engine speed, engine load, manifold air pressure, charge temperature, etc.

Once the operating conditions are determined, the routine proceeds to 804 where fuel handling considerations are determined. As described above with reference to FIG. 4, the fuel handling considerations may include conditions such as ambient temperature and vaporizer coolant temperature. At 806, fuel economy considerations are determined. As described above with reference to FIG. 5, the fuel economy consideration may include conditions such as engine load. At 808, fuel tank handling considerations are determined. As described above with reference to FIG. 6, the fuel tank handling considerations may include conditions such as fuel tank temperature. At 810, combustion considerations are determined. As described above with reference to FIG. 7, the combustion considerations may include charge air temperature, engine power output, and fuel rate.

At 812, one or more of liquid, gaseous, and vaporized liquid fuel are injected based on the fuel considerations determined above. For example, each type of fuel injection may be used simultaneously in proportion to the need. As one example, some gaseous fuel from the top of the fuel tank may be used to achieve fuel tank cooling, but the rest of the fuel may be liquid fuel for increased power. As another example, liquid fuel injection may be used as much as possible to keep the underhood fuel cool. However, if the fuel tank heats up as a result, gaseous fuel from the top of the fuel tank may be injected. Further, in order to increase fuel economy, some of the liquid fuel may be directed through the vaporizer to form vaporized liquid fuel for injection to the engine.

In this way, one or more types of fuel injection may be used based on various operating conditions described herein. For example, liquid and gaseous fuel injection may be used simultaneously, liquid and vaporized liquid fuel injection may be used simultaneously, or liquid, gaseous, and vaporized liquid fuel injection may be used simultaneously.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:

under a first condition, injecting liquid fuel to the engine;

under a second condition, in response to a coolant temperature greater than a threshold coolant temperature, injecting vaporized liquid fuel to the engine via a first set of fuel injectors; and under a third condition, injecting gaseous fuel to the engine via the first set of fuel injectors.

2. The method of claim 1, further comprising, under the second condition, vaporizing liquid fuel from a bottom of a fuel tank via a vaporizer to form the vaporized liquid fuel, and wherein, under the third condition, the gaseous fuel is from a top of the fuel tank.

3. The method of claim 1, wherein the first set of fuel injectors are port fuel injectors.

4. The method of claim 1, further comprising at least one of port injecting and direct injecting the liquid fuel.

5. The method of claim 1, wherein the first condition includes a request for increased power.

6. The method of claim 1, further comprising, during the first condition, increasing charge cooling.

7. The method of claim 1, wherein the second condition further includes at least one of a high ambient temperature and a request for increased fuel economy.

8. The method of claim 1, further comprising, during the second condition, reducing a temperature of coolant passing through a vaporizer which vaporizes liquid fuel.

9. The method of claim 1, wherein the third condition includes at least one of a high ambient temperature and a low fuel rate.

10. The method of claim 1, further comprising, during the third condition, reducing a fuel tank temperature.

11. The method of claim 1, wherein two or more of the first, second, and third conditions occur simultaneously.

12. A method for an engine system, comprising:

responsive to a charge air temperature greater than a threshold charge air temperature, injecting liquid fuel to an engine of the engine system;

responsive to a coolant temperature greater than a threshold coolant temperature, injecting vaporized liquid fuel to the engine; and responsive to a fuel tank temperature greater than a threshold tank temperature, injecting gaseous fuel to the engine.

13. The method of claim 12, further comprising injecting liquid fuel responsive to a request for increased power.

14. The method of claim 12, further comprising injecting vaporized liquid fuel responsive to at least one of a high ambient temperature and a request for increased fuel economy.

15. The method of claim 12, further comprising injecting gaseous fuel responsive to at least one of a high ambient temperature and a low fuel rate.

16. The method of claim 12, further comprising directing liquid fuel through a vaporizer to form the vaporized liquid fuel.

17. An engine system, comprising:

a fuel tank;

a first set of port fuel injectors for injecting gaseous and vaporized liquid fuel from the fuel tank to an engine of the engine system;

a second set of port fuel injectors for injecting liquid fuel from the fuel tank to the engine;

a set of direct fuel injectors for injecting liquid fuel from the fuel tank to the engine; and a control system with computer readable instructions for: under a first condition, injecting liquid fuel from a bottom of the fuel tank; under a second condition, receiving an indication of a coolant temperature greater than a threshold coolant temperature and injecting vaporized liquid fuel; where the vaporized liquid fuel is liquid fuel from the bottom of the fuel tank vaporized by a vaporizer; and under a third condition, injecting gaseous fuel from a top of the fuel tank.

18. The engine system of claim 17, wherein the first condition includes one or more of the control system receiving a request for increased power and receiving an indication of a charge air temperature greater than a threshold charge air temperature.

19. The engine system of claim 17, wherein the second condition further includes one or more of the control system receiving a request for increased fuel economy and receiving an indication of a high ambient temperature.

20. The engine system of claim 17, wherein the third condition includes one or more of the control system receiving an indication of a high ambient temperature, receiving an indication of a low fuel rate, and receiving an indication of a fuel tank temperature greater than a threshold tank temperature.

* * * * *